United States Patent
Maeda et al.

(10) Patent No.: US 7,550,181 B2
(45) Date of Patent: *Jun. 23, 2009

(54) INFORMATION RECORDING MEDIUM

(75) Inventors: Hiroki Maeda, Shinjuku-Ku (JP); Kyoko Kogo, Shinjuku-Ku (JP); Junichi Hanna, Yokohama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 470 days.

This patent is subject to a terminal disclaimer.

(21) Appl. No.: 10/713,194

(22) Filed: Nov. 17, 2003

(65) Prior Publication Data

US 2004/0095517 A1 May 20, 2004

Related U.S. Application Data

(63) Continuation of application No. 09/477,725, filed on Jan. 5, 2000, now abandoned.

(30) Foreign Application Priority Data

Jan. 8, 1999 (JP) .................. 11-002955

(51) Int. Cl.
C09K 19/04 (2006.01)
G02F 1/13 (2006.01)

(52) U.S. Cl. ............... 428/1.1; 428/913; 349/2; 349/24; 349/25

(58) Field of Classification Search ............ 428/1.1, 428/913; 430/20; 349/2, 24, 25
See application file for complete search history.

(56) References Cited

U.S. PATENT DOCUMENTS

| | | | |
|---|---|---|---|
| 3,876,286 A | 4/1975 | Deutscher et al. | |
| 4,490,305 A | 12/1984 | Eidenschink et al. | 260/465 |
| 4,780,383 A | 10/1988 | Garrett et al. | 430/11 |
| 4,886,718 A | 12/1989 | Eich et al. | 430/20 |
| 4,946,260 A * | 8/1990 | Fujumura et al. | 349/170 |
| 5,227,905 A * | 7/1993 | Clark et al. | 349/172 |
| 5,429,770 A | 7/1995 | Closs et al. | |

(Continued)

FOREIGN PATENT DOCUMENTS

EP    0 651 381 A1    5/1995

(Continued)

OTHER PUBLICATIONS

Abstract of the article "Anomalous High Carrier Mobility in Smectic E Phase of a 2-phenylnaphthalene derivative", Applied Physics Letters, Dec. 21, 1998, 73 (25) p. 3733-3735.

(Continued)

*Primary Examiner*—Hai Vo
(74) *Attorney, Agent, or Firm*—Oliff & Berridge PLC

(57) ABSTRACT

A novel information recording medium is provided which records information upon the application of thermal energy, reads the recorded information by detecting the value of photoelectric current generated by light applied to the information recorded portion, and can realize multi-valued information recording or analog information recording.

The information recording medium comprises: a pair of electrodes; and a liquid crystal material filled into a gap between the electrodes, the liquid crystal material having a property such that the charge-transport properties are varied according to the phase transfer between a plurality of stable liquid crystal phases of the liquid crystal and/or the history of the phase transfer.

8 Claims, 1 Drawing Sheet

U.S. PATENT DOCUMENTS

| | | | |
|---|---|---|---|
| 5,645,758 A * | 7/1997 | Kawasumi et al. | 252/299.01 |
| 5,646,927 A | 7/1997 | Shimizu et al. | |
| 5,677,063 A | 10/1997 | Kamiyama et al. | |
| 5,693,421 A | 12/1997 | Kamiyama et al. | |
| 5,800,950 A | 9/1998 | Hirao et al. | |
| 5,861,108 A | 1/1999 | Ishida et al. | 252/299.62 |
| 5,903,296 A | 5/1999 | Shimizu et al. | |
| 5,905,547 A * | 5/1999 | Shimizu et al. | 349/2 |
| 5,932,301 A | 8/1999 | Kamiyama et al. | |
| 5,980,779 A | 11/1999 | Hanna et al. | 252/299.62 |
| 6,174,455 B1 * | 1/2001 | Hanna et al. | 252/299.62 |
| 6,224,787 B1 | 5/2001 | Hanna et al. | |

FOREIGN PATENT DOCUMENTS

| | | |
|---|---|---|
| EP | 0 669 548 A1 | 8/1995 |
| EP | 0 763 532 | 3/1997 |
| GB | 2 248 963 A | 4/1992 |
| JP | 59 035989 | 2/1984 |
| JP | A-61-280046 | 12/1986 |
| JP | 09043581 A * | 2/1997 |
| JP | A-09-185043 | 7/1997 |
| JP | 10 312711 | 11/1998 |

OTHER PUBLICATIONS

Abstract of the atricle "Fast Ambipolar Carrier Transport in Smectic Phases of Phenylnaphthalene Liquid Crystal", Applied Physics Letters, Aug. 4, 1997, 71 (5) p. 602-604.

Abstract of the article "Relations of Isomorphism Between Liquid Crystalline Phases 21 Synthesis and Liquid Crystalline Properties of 4,4'-disubstituted Biphenyls", HJournal de Physique, Colloque (1975), (1) p. 349-354.

* cited by examiner

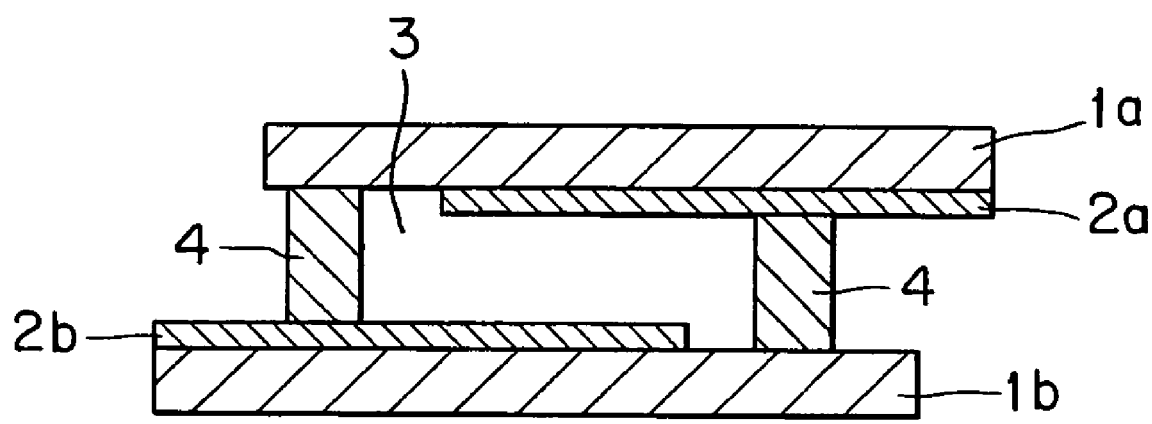
F I G. 1

INFORMATION RECORDING MEDIUM

This is a Continuation of application Ser. No. 09/477,725 filed Jan. 5, 2000.

TECHNICAL FIELD

The present invention relates to an information recording medium, and more particularly to an information recording medium utilizing a stable change in specific charge-transport properties of a liquid crystal material.

BACKGROUND OF THE INVENTION

In recent years, various information recording media, such as magnetic recording media, thermal recording media, and optical recording media, have been developed and put to practical use. The present inventors have hitherto made studies on optical, physico-chemical, or electric characteristics of liquid crystal materials, and, up to now, have proposed a liquid crystal charge-transport material which focuses on charge-transport properties of a specific liquid crystal system (for example, Japanese Patent Application No. 76820/1998).

The present invention has been made as a result of attention to a property of a liquid crystal material such that the charge-transport properties of the liquid crystal material are stably varied upon phase transfer between a plurality of liquid crystal phases, and it is an object of the present invention to provide a novel information recording medium which records information upon the application of thermal energy and reads the recorded information by detecting the value of photoelectric current generated by light applied to an information recorded portion and, in addition, can realize multi-valued information recording or analog information recording.

DISCLOSURE OF THE INVENTION

The above object of the present invention can be attained by an information recording medium comprising: a pair of electrodes; and a liquid crystal material filled into a gap between said electrodes, said liquid crystal material having a property such that the charge-transport properties are varied according to the phase transfer between a plurality of stable liquid crystal phases of the liquid crystal and/or the history of the phase transfer.

According to the present invention, the phase transfer of the liquid crystal material occurs upon a change in temperature of the liquid crystal material. This phase transfer is reversible, and the domain structure of each varied liquid crystal phase is stable.

According to the information recording medium of the present invention, information may be recorded by applying thermal energy, and the recorded information may be read by measuring the value of photoelectric current generated by light applied to the information recorded portion.

Thus, the information recording medium of the present invention skillfully utilizes phase transfer between a plurality of stable liquid crystal phases of a liquid crystal material and/or a property such that the charge-transport properties are changed according to the history of the phase transfer. By virtue of this constitution, despite the fact that the liquid crystal material layer has a single layer structure, it is possible to realize information recording which relies upon a phase change as a result of phase transfer between two or more liquid crystal phases, and information recording depending upon the level of thermal energy. Therefore, not only binary digital information but also multi-valued information or analog information may be recorded.

Further, according to the present invention, mere filling of a liquid crystal material into a specific gap between electrodes can provide a medium or an element. Therefore, the present invention is also advantageous in that the information recording medium can be simply produced.

BRIEF DESCRIPTION OF THE DRAWING

FIG. 1 is a cross-sectional view showing the construction of an information recording medium according to one embodiment of the present invention.

BEST MODE FOR CARRYING OUT THE INVENTION

FIG. 1 shows one embodiment of the information recording medium according to the present invention. This information recording medium comprises: a pair of substrates 1a and 1b; electrodes 2a and 2b provided respectively on the substrates 1a and 1b; spacers 4 provided between the electrodes 2a and 2b to form a gap between the electrodes 2a and 2b; and a liquid crystal material 3 filled into the gap. This liquid crystal material has a property such that the charge-transport properties of the liquid crystal material are varied according to phase transfer of the liquid crystal material between a plurality of stable liquid crystal phases.

Preferably, at least one of the substrates 1a and 1b is formed of a light-transparent material, such as glass, although the material is not particularly limited. Electrodes provided on the substrates are preferably transparent electrodes of ITO (indium tin oxide) or the like. The pair of substrates for constituting cells of the information recording medium are integrated with each other through the spacers 4 with the aid of fixing means, such as an adhesive, and a liquid crystal material is filled into the gap created between the substrates.

The liquid crystal material is preferably a bipolar photoconductive liquid crystal, and specific examples of preferred liquid crystal materials usable herein include rodlike liquid crystal systems, for example, phenylnaphthalene liquid crystals, such as 2-(4'-octylphenyl)-6-dodecyloxynaphthalene (abbreviated to "8-PNP-012"), 2-(4'-octylphenyl)-6-butyloxynaphthalene (abbreviated to "8-PNP-04"), and 10-PNP-09, and biphenyl liquid crystals, such as 2-4'-heptyloxy-4'-octyl-biphenyl (abbreviated to "60-BP-8").

Monopolar photoconductive liquid crystals may also be preferably used so far as the polarity of the voltage applied to electrodes, to which excitation light is applied, is selected. Specific examples of preferred monopolar photoconductive liquid crystals usable herein include phenylbenzothiazole liquid crystals, for example, biphenyl liquid crystals having carbonyl and alkoxy in their ends, such as 2-(4'-heptyloxyphenyl)-6-dodecylthiobenzothiazole (abbreviated to "70-PBT-S12"), 4-heptyloxy-4'-dodecylbiphenyl (abbreviated to "70-BP—CO-11"), and 4-hexyloxy-4'-butanoylbiphenyl (abbreviated to "60-BP—CO-4").

For example, the 8-PNP-012 exhibits a phase transfer behavior of Cryst. −79° C.-SmB−101° C.-SmA−121° C.-Iso. In the SmB phase on low temperature side, for both electrons and holes, the mobility is $1.6 \times 10^{-3}$ cm$^2$/Vs, and, also in the SmA phase on high temperature side, the mobility is $2.5 \times 10^{-4}$ cm$^2$/Vs.

Interestingly, the specific liquid crystal material has a property such that the charge-transport properties are varied according to phase transfer caused by a change in temperature between two or more stable liquid phases. Here what is more important is as follows. In the conventional liquid crystal phase, polycrystalline structural defects behave as traps, leading to significant inhibition of charge-transport properties, whereas, according to the present invention, the specific polydomain structure of the liquid crystal phase formed does not inhibit the charge-transport properties.

It should be noted that the above unexpected advantageous properties can be more effectively developed by controlling the relationship between the thickness of the gap, between the electrodes, and the domain size in the initial state of the liquid crystal material so as to satisfy a specific requirement.

Specifically, according to a preferred embodiment of the present invention, the size of the gap between the electrodes is larger than the domain size at least in the initial state of the liquid crystal material. More specifically, the thickness between the pair of electrodes preferably satisfies both requirements represented by inequalities (A) and (B):

(Permeation depth at excitation light wavelength of liquid crystal material)<(Thickness between pair of electrodes)     (A)

(Thickness between pair of electrodes)<(Thickness capable of exhibiting field strength so as to enable reading of photoelectric current)     (B)

For example, when the 8-PNP-012 is used as the liquid crystal material, the distance between the electrodes is suitably in the range of 1.5 to 150 μm, more preferably 5.0 to 50.0 μm.

According to the present invention, the phase transfer of the liquid crystal material occurs upon a change in temperature of the liquid crystal material. More specifically, phase transfer or a change in domain structure attributable to the phase transfer can be created by thermal energy application means, such as a thermal head or a laser beam. Further, the use of the thermal energy application means can realize high-density information recording.

For example, in the information recording medium shown in FIG. 1, upon the application of a laser beam from any side of the substrate, thermal energy is supplied to the whole area of the cell or a part of the cell. This creates phase transfer or a change in domain structure attributable to the phase transfer according to the thermal energy applied to the liquid crystal material layer. The charge-transport properties are varied according to the transferred phase. The domain structure in the transferred phase is stable unless thermal energy on such a level as to cause transfer to the isotropic phase is applied to the same site. Thus, inherent information can be recorded.

On the other hand, the magnitude of photoelectric current attributable to charges, which have been injected by the application of light (for example, pulsed light as a trigger) into the information recorded portion, is determined by the charge-transport properties in the light applied site. Therefore, the recorded information can be read by detecting the quantity as a current value from the electrode.

Further, in the information recording, varying the level of thermal energy applied to thereby develop charge-transport properties between those of two phases according to the energy level can realize binary digital information recording, as well as multi-valued or analog information recording.

According to another embodiment of the present invention, the background for information recording may be in a state such that the charge-transport properties are inhibited attributable to polycrystalline structural defects in the initial state of the liquid crystal charge-transport material, and, in this case, the information recording may be carried out by phase transfer caused in the background upon the application of thermal energy.

EXAMPLE

The following production example further illustrates the present invention.

Production Example

Glass substrates provided with ITO were disposed as transparent electrodes so as to face each other while providing a gap of 150 μm between the electrodes through a polyimide sheet as a spacer. The spacing between both the substrates was fixed by means of a thermoset resin to form a sandwich cell. A liquid crystalline charge-transport material (8-PNP-012) in the form of an isotropic phase (150° C.) was poured into the sandwich cell by capillarity. In this liquid crystal material, molecule aligning treatment, which is usually required, is not particularly necessary, because the liquid crystal material has a property such that the material molecules used in its major axis direction are aligned horizontally to the glass substrate. This property is utilized in the present production example.

At a cooling rate at 10° C./min or lower, in general, upon the formation of the smectic phase structure molecules of the liquid crystal material composed of rodlike molecules including 8-PNP-012 are likely to arrange so that the substrate is horizontal to the major axis. In the smectic A phase, since there is no anisotropy around the major axis, phase transfer at the time of cooling leads to a tendency that the layer structure is isotropically grown in the thicknesswise direction of the cell and in the direction parallel to the substrate. When the major axis direction of molecules is not regulated in a specific direction by the control of the orientation, the major axis direction of molecules within growth nuclei (domain source) of phase structures, which have been simultaneously developed in many places, is random in an early stage. In this case, upon contact between small domains at the time of growth, a more stable domain absorbs the other domain. The growth is continued in this way. Finally, even though adjacent domains have different alignment directions, a stable state is attained on the whole by the influence of substrate wall surface or the like. In addition to the above phenomenon, unexpectedly, a phenomenon was observed wherein domain boundaries formed at that time do not inhibit the charge-transport properties. In general, the larger the cell gap, the larger the domain size. However, it has been found that the charge-transport properties remain unchanged independently of the domain size.

Further, in the present example, it was found that when the cell is sandwiched between two heat sinks formed of an aluminum plate, cooling of the liquid crystal material from isotropic phase at such a rate as to reach the crystal phase (for about 5 sec), a polydomain structures formed of domains having a size smaller than the size of the cell gap can be provided in all the liquid crystal phases (SmA phase and SmB phase) which the liquid crystal material exhibits.

Once the domain structure has been formed in the liquid crystal phase, the basic shape of the domain structure is stably maintained until the temperature is again raised to create an isotropic phase. In the present example, it is estimated that the rate of cooling for transfer from the isotropic phase to the liquid crystal phase is a major factor which determines whether or not fine domains can be stably present.

The TOF (time-of-flight) method was used to measure the charge-transport properties of the cell, occupied by domains smaller than the cell gap, prepared according to the above procedure. In the TOF method, the time necessary for the carrier generated in the sample to travel to the counter electrode is investigated from a transient photoelectric current waveform obtained by the application of pulsed light, and the carrier mobility is determined based on the results. In this case, a pulsed light of a nitrogen laser (pulse width 600 psec, wavelength 337 nm, output 40 μJ) was used as the excitation light, and a direct voltage (maximum 500 V) was applied to the sample fixed onto a hot stage.

As a result, it was found that the charge-transport property (carrier mobility) is provided at the time when an inflection point appears in the current value.

Initial state: When the temperature is raised from room temperature (crystal phase) to a temperature at which the SmB phase is developed (90° C.), any transient current indicating good charge-transport properties (about $10^{-3}$ cm$^2$/Vs) inherent in this material is not observed. This is considered attributable to the fact that the effect of allowing structural barriers, which significantly inhibit the charge-transport properties in the crystal phase, to remain upon phase transfer to a phase adjacent to the crystal phase has been emphasized by making the size of the polydomain smaller than the cell gap. This state is such that properties of a polycrystal have been substantially imparted in spite of the liquid crystal phase. This state is called "off state" for the sake of convenience. For some applications, this state may be regarded as "on state."

Rewriting (1): When the temperature of the whole cell in an off state was raised to a temperature at which the SmA phase appeared (110° C.) followed by temperature falling to return the phase to the SmB phase, a transient current reflecting the charge transportation in this material was observed. This is considered attributable to a phenomenon such that the polycrystalline charge-transport trap provided in the off state has disappeared by once causing phase transfer to a phase having low crystallinity.

The same effect was attained when, in the cell face maintained in the SmB phase, a part of the electrode site was heated for 15 sec by means of a thermal head (in this case, the head temperature should be below the temperature (118° C.) at which transfer to the isotropic phase occurs; the head temperature in the present example being 110° C.) followed by standing to return the temperature of the heated site to 90° C. It was demonstrated that heating any place or region on the electrode permits the heated site to be rewritten into charge-transfer properties different from those of the sites in an off state.

In this case, the rewriting is not necessarily required to be carried out in electrode region units. That is, even when any region within at least one pair of counter electrodes is selectively rewritten, the written information can be read in terms of the charge-transport properties and the current value, for example, by selectively applying a read-out light utilizing scanning irradiation.

In addition to this, the application of a laser beam having a proper output to conduct heat treatment is possible as the rewriting means.

Rewriting (2): When a cell in an off state or a region subjected to the above writing was heated to a temperature (130° C.) at which the isotropic phase appeared followed by cooling to the SmB phase at a rate of 10° C./min, a region different from the off-state region was obtained wherein the domain size was larger than the cell gap. Both rewriting of the whole cell and selective rewriting of the domain size using a thermal head having a head temperature of 150° C. were carried out. As a result, more clear rewriting of the charge-transfer properties than the case of the rewriting (1) could be confirmed.

In the rewriting (1), since the damping rate of the transient current waveform (which reflects the situation of trapping of the resultant carrier in the medium) is identical to that of the current waveform in the rewriting (2), good charge-transport properties were obtained. It is considered that, since photo-excitation for reading is scattered by fine domains, the injection of charges is unsatisfactory resulting in small transient current values. The rewriting (2) corresponds to the case where an element limiting the charge injection in this cell construction was eliminated by varying the domain structure as a result of phase transfer to the isotropic phase.

Further, for both writing by means of a thermal head and writing by means of a laser beam, the degree of the change in domain structure caused by the phase transfer can be regulated by continuously varying the level of thermal energy for writing. This can realize intermediate control in charge-transport properties and current values as output information.

As is apparent from the results of the above example, the present invention can provide a novel information recording medium which records information upon the application of thermal energy, reads the recorded information by detecting the value of photoelectric current generated by light applied to the information recorded portion, and can realize multi-valued information recording or analog information recording.

The invention claimed is:

1. An information recording medium consisting of:
a pair of electrodes; and
a liquid crystal material filled into a gap between said electrodes, the liquid crystal material comprising a rod-shape liquid crystal compound;
wherein
the liquid crystal material has a property such that charge-transport properties are varied according to a phase transfer between a plurality of stable liquid crystal phases of the liquid crystal and/or a history of the phase transfer, the phase transfer of the liquid crystal material occurring upon a change in temperature of the liquid crystal material between a crystalline phase at a room temperature to an isotropic phase in a final state through a smectic phase at an elevated temperature;
the liquid crystal material comprises a material selected from the group consisting of a phenylbenzothiazole liquid crystal, 4-hexyloxy-4-butanoylbiphenyl, and a phenylnaphthalene liquid crystal wherein the phenylnaphthalene is one selected from the group consisting of 2-(4'-octylphenyl)-6-butyloxynaphthalene, 2-(4'-octylphenyl)-6-nonyloxynaphthalene and a mixture thereof;
a thickness of the gap between the electrodes is larger than a domain size of the liquid crystal compound at least in the initial state of the liquid crystal material, and the thickness of the gap between the electrodes being smaller than a domain size of the liquid crystal compound in a cooled state from the isotropic phase in a final state, wherein the initial state of the liquid crystal material is defined as a crystalline phase at a room temperature through a smectic phase at an elevated temperature; and
the information recording medium is configured so that information can be recorded by application of thermal energy to an area of the medium, and recorded information can be read by detecting a value of photoelectric current generated by light applied to the area of the medium at which information was recorded.

2. The information recording medium according to claim 1, wherein at least one of the pair of electrodes is transparent to light.

3. The information recording medium according to claim 1, wherein a thermal head or a laser beam is used as means for applying thermal energy for information recording.

4. The information recording medium according to claim 1, wherein the phenylbenzothiazole liquid crystal material is 2-(4'-heptyloxyphenyl)-6-dodecylthiobenzothiazole.

5. The information recording medium according to claim 1, wherein
the liquid crystal material comprises a liquid crystalline charge-transport material,
a background for information recording is in a state that the charge-transport properties are inhibited attributable to polycrystalline structural defects in the initial state of the liquid crystal charge-transport material, and
information recording is carried out by phase transfer caused in the background upon the application of thermal energy.

6. The information recording medium according to claim 1, wherein two or more charge-transport properties can be developed in a specific liquid crystal phase according to the level of the thermal energy applied.

7. An information recording medium consisting of:
a pair of electrodes, wherein the pair of electrodes is provided on a substrate; and
a liquid crystal material filled into a gap between said electrodes, the liquid crystal material comprising a rod-shape liquid crystal compound;
wherein
the liquid crystal material has a property such that charge-transport properties are varied according to a phase transfer between a plurality of stable liquid crystal phases of the liquid crystal and/or a history of the phase transfer, the phase transfer of the liquid crystal material occurring upon a change in temperature of the liquid crystal material between a crystalline phase at a room temperature to an isotropic phase in a final state through a smectic phase at an elevated temperature;
the liquid crystal material comprises a material selected from the group consisting of a phenylbenzothiazole liquid crystal, 4-hexyloxy-4-butanoylbiphenyl, and a phenylnaphthalene liquid crystal wherein the phenylnaphthalene is one selected from the group consisting of 2-(4'-octylphenyl)-6-butyloxynaphthalene, 2-(4'-octylphenyl)-6-nonyloxynaphthalene and a mixture thereof;
a thickness of the gap between the electrodes is larger than a domain size of the liquid crystal compound at least in the initial state of the liquid crystal material, and the thickness of the gap between the electrodes being smaller than a domain size of the liquid crystal compound in a cooled state from the isotropic phase in a final state, wherein the initial state of the liquid crystal material is defined as a crystalline phase at a room temperature through a smectic phase at an elevated temperature; and
the information recording medium is configured so that information can be recorded by application of thermal energy to an area of the medium, and recorded information can be read by detecting a value of photoelectric current generated by light applied to the area of the medium at which information was recorded.

8. The information recording medium according to claim 1, wherein the thickness between the pair of electrodes satisfies both requirements represented by inequalities (A) and (B):
(A) (Permeation depth at excitation light wavelength of liquid crystal material)<(Thickness between pair of electrodes)
(B) (Thickness between pair of electrodes)<(Thickness which can exhibit field strength such as to enable reading of photoelectric current).

* * * * *